United States Patent [19]
Fukushima et al.

[11] Patent Number: 5,510,179
[45] Date of Patent: Apr. 23, 1996

[54] MAGNETIC RECORDING MEDIUM HAVING AT LEAST TWO LAYERS WHEREIN THE UPPERMOST LAYER CONTAINS ALUMINA PARTICLES WHICH CONTAIN SPECIFIED OXIDES

[75] Inventors: Kiyoto Fukushima; Sadafumi Iijima; Motoyuki Tsunoda, all of Nagano, Japan

[73] Assignee: TDK Corporation, Tokyo, Japan

[21] Appl. No.: 361,578

[22] Filed: Dec. 22, 1994

[30] Foreign Application Priority Data

Dec. 22, 1993 [JP] Japan ................. 5-346248

[51] Int. Cl.⁶ ..................................... G11B 5/00
[52] U.S. Cl. ............ 428/323; 428/328; 428/332; 428/336; 428/402; 428/694 BN; 428/900; 428/694 BS; 428/694 BM
[58] Field of Search ............... 428/323, 328, 428/332, 336, 402, 694 BN, 900, 694 BM, 694 BS

[56] References Cited

U.S. PATENT DOCUMENTS

| | | | |
|---|---|---|---|
| 4,469,758 | 9/1984 | Scott | 428/693 |
| 4,780,365 | 10/1988 | Kakuishi | 428/323 |
| 5,080,967 | 1/1992 | Noguchi | 428/323 |
| 5,366,795 | 11/1994 | Goto | 428/212 |

FOREIGN PATENT DOCUMENTS

| | | |
|---|---|---|
| 459690 | 9/1992 | Japan . |
| 4248119 | 9/1992 | Japan . |

*Primary Examiner*—Stevan A. Resan
*Attorney, Agent, or Firm*—Oblon, Spivak, McClelland, Maier & Neustadt

[57] ABSTRACT

A magnetic recording medium has at least two coating layers on a non-magnetic substrate. The uppermost layer of the coating layers is a magnetic layer having a thickness of 0.2–0.5 μm thick and comprising a ferromagnetic powder, inorganic material-containing alumina particles having a mean particle size of 0.1–0.3 μm, and a binder. The medium ensures effective head cleaning and has improved durability and still life.

4 Claims, No Drawings

MAGNETIC RECORDING MEDIUM HAVING AT LEAST TWO LAYERS WHEREIN THE UPPERMOST LAYER CONTAINS ALUMINA PARTICLES WHICH CONTAIN SPECIFIED OXIDES

This invention relates to a magnetic recording medium having at least two coating layers.

BACKGROUND OF THE INVENTION

In the field of magnetic recording media including audio tape, video tape, floppy disks, and computer tape, it is a common practice to add non-magnetic inorganic material powder such as $Al_2O_3$, $Cr_2O_3$, $TiO_2$, $SiO_2$, SiC, $\alpha$-$Fe_2O_3$, and $ZnO_2$ for preventing the magnetic layer from damage by sliding contact with the magnetic head. Unless the type, size and amount of inorganic material particles to be added are carefully selected, such inorganic particles can damage or abrade the magnetic head or degrade the electromagnetic properties of magnetic recording media.

Often a non-magnetic inorganic material powder having high hardness is selected and added to the magnetic layer alone or in admixture for reinforcement. In accordance with the current requirement of higher performance for magnetic recording media such as video tape and digital recording tape, magnetic recording media are improved in surface smoothness by the use of microparticulate magnetic powder, the use of a highly dispersible binder or the like, which in turn, tends to deteriorate the durability, friction stability, and head seizure of the magnetic layer. It is then desired to further enhance the durability and head cleaning effect of a coating.

If conventional non-magnetic inorganic material powder commonly used in the prior art is used in high-performance magnetic recording media, there arise a number of problems including deteriorated electromagnetic properties, less reinforcement, possible damaging of the magnetic layer during durability test operation, ineffective head cleaning, increased head adhesion, and reduced outputs.

Japanese Patent Publication (JP-B) No. 59690/1992 discloses to cover non-magnetic particles at their surface with an aliphatic compound. This permits the non-magnetic particles to be uniformly dispersed in the magnetic layer for improving the abrasion resistance of the magnetic layer at no sacrifice of smoothness. This solution, however, fails to improve durability and magnetic head cleaning effect to such an extent as would meet the performance requirements of advanced magnetic recording media.

Then the inventors proposed in Japanese Patent Application Kokai (JP-A) No. 248119/1992 a magnetic recording medium having inorganic material-containing $\alpha$-$Al_2O_3$ dispersed in the magnetic layer. As compared with the conventional non-magnetic inorganic material powders, the inorganic material-containing alpha-alumina offers improved head cleaning effect to reduce debris adhesion to the head and improves the durability of the magnetic layer, resulting in a magnetic recording medium having an improved still life. A magnetic recording tape having a single magnetic layer of 3 μm thick is demonstrated in Example.

This medium, however, is yet insufficient with respect to head clogging and still life. In an experiment that only tapes as manufactured (so-called virgin tape) or tapes which have been used a few times were operated with a used head for recording and replay, head clogging occurred within 12 cassettes of virgin tape because of insufficient head cleaning effect. This becomes a serious problem on practical use.

SUMMARY OF THE INVENTION

An object of the present invention is to provide a magnetic recording medium having improved head cleaning effect, reduced head clogging, durability, and a satisfactory still life. The reduced head clogging means that the magnetic recording medium causes less head clogging when the medium in an unused or a few times used condition is operated with a worn head for recording and replay.

According to the present invention, there is provided a magnetic recording medium comprising at least two coating layers on one surface of a non-magnetic substrate. The uppermost layer of the coating layers is a magnetic layer comprised of alumina particles containing an inorganic material. The uppermost magnetic layer has a thickness of 0.2 to 0.5 μm and the alumina particles have a mean particle size of 0.1 to 0.3 μm. Better results are obtained when the thickness t of the uppermost magnetic layer and the mean particle size d of the alumina particles are controlled to give a ratio t/d of from 1 to 4.

The uppermost layer preferably contains 0.4 to 16% by weight of the inorganic material-containing alumina particles. The inorganic material in the alumina particles is preferably comprised of one or more elements of Si, Fe, Ti, W, Mg, and Mn, typically in oxide form. The alumina particles desirably contain the inorganic material(s) in a total amount of 0.05 to 5.0% by weight of the entire alumina particles when calculated as $SiO_2$, $Fe_2O_3$, $TiO_2$, $WO_3$, $MgO$, and MnO. Preferably the inorganic material-containing alumina particles are prepared by firing a mixture of an aluminum compound and an inorganic compound so that the inorganic material is incorporated within alumina particles.

BENEFITS OF THE INVENTION

As defined above, the magnetic recording medium of the invention includes at least two coating layers on one surface of a non-magnetic substrate. The uppermost layer of the coating layers is a magnetic layer having a thickness t of 0.2 to 0.5 μm and comprising inorganic material-containing alumina ($Al_2O_3$) particles with a mean particle size d of 0.1 to 0.3 μm as an abrasive. Since abrasive particles are present at the surface of the magnetic recording medium, those abrasive particles protruding from the surface abrade or polish the surface of the magnetic head upon sliding contact therewith, thereby preventing head clogging and improving the durability of the magnetic layer against sliding contact.

The inorganic material-containing alumina particles are desirably obtained by firing a mixture of an aluminum compound and an inorganic compound so that the inorganic material may form a solid solution with alumina. As compared with conventional abrasives, these alumina particles have sharp angular edges and thus maintain a significant head cleaning effect over a longer period. The magnetic layer containing the present abrasive particles effectively withstands sliding contact with the magnetic head, leading to an increased still life.

Such non-magnetic inorganic powder is generally added for the purposes of improving head cleaning effect and durability of a magnetic layer against sliding contact and reinforcing a coating layer. As a general rule, if a coating layer to which non-magnetic inorganic powder is added is substantially thick relative to the mean particle size of non-magnetic inorganic powder, most of non-magnetic inorganic particles are buried within the coating layer to provide sufficient reinforcement of the coating layer, but less of non-magnetic inorganic particles project from the surface of the coating layer, contributing little to head cleaning effect and still life extension.

Unlike JP-A 248119/1992 referred to above, the present invention limits the thickness t of the uppermost magnetic layer to the range of 0.2 to 0.5 μm. The abrasive used in this uppermost magnetic layer is inorganic material-containing alumina particles having a mean particle size d of 0.1 to 0.3 μm. When the thickness t of the magnetic layer and the mean particle size d of the abrasive are controlled in these ranges, particularly when the thickness-to-particle size ratio t/d ranges from 1 to 4, for a given loading of abrasive particles, more alumina particles protrude from the uppermost magnetic layer. This permits the inorganic material-containing alumina particles to exert its significant head cleaning effect to a more outstanding extent. Particularly when the magnetic recording medium in an unused or only a few times used condition is operated with a worn head, the medium is remarkably effective for avoiding clogging of the head. These advantages are outstandingly accomplished only when the thickness of the magnetic layer and the mean particle size of the abrasive fall in the specific ranges defined herein.

DETAILED DESCRIPTION OF THE INVENTION

The magnetic recording medium of the present invention has at least two coating layers on one surface of a non-magnetic substrate. The uppermost layer of the coating layers is a magnetic layer having a thickness t of 0.2 to 0.5 μm and typically comprising a ferromagnetic powder, inorganic material-containing alumina ($Al_2O_3$) particles having a mean particle size d of 0.1 to 0.3 μm, and a binder. The layer or layers of the coating layers underlying the uppermost layer, which are designated underlying layer or layers, may be either magnetic or non-magnetic. There are included one or more magnetic or non-magnetic underlying layers. Where more than one underlying layer is included, they may be all magnetic layers, or all non-magnetic layers, or a mixture of a magnetic layer and a non-magnetic layer. Where a non-magnetic layer is included, however, most often only the lowermost layer is a non-magnetic layer. In addition to the coating layers, it is acceptable to provide an undercoat layer for the purpose of improving the adhesion between the non-magnetic substrate and the underlying magnetic or non-magnetic layer and a backcoat layer on the opposite surface of the non-magnetic substrate remote from the magnetic layer.

The inorganic material-containing alumina ($Al_2O_3$) particles contained in the uppermost magnetic layer should have a mean particle size d of 0.1 to 0.3 μm, preferably 0.20 to 0.30 μm. Alumina particles of such a size protrude from the surface of the uppermost magnetic layer, accomplishing a significant head cleaning effect to extend a still life. Alumina particles with a mean particle size of less than 0.1 μm are less effective for reinforcing the magnetic layer and protrude from the magnetic layer surface to a less extent, achieving a reduced head cleaning effect which is unacceptable in practice in that clogging can occur between a worn head and a virgin tape. The still life is also shortened. Alumina particles with a mean particle size of more than 0.3 μm rather exacerbate the surface properties of the uppermost magnetic layer, resulting in lower electromagnetic properties. It is to be noted that the mean particle size is determined through an observation under a transmission electron microscope.

In one preferred embodiment, the thickness t of the uppermost magnetic layer and the mean particle size d of the inorganic material-containing alumina particles are controlled such that t/d ranges from 1 to 4, more preferably from 1.2 to 3.8. With t/d=1 to 4, the magnetic recording medium of the invention accomplishes an outstandingly improved head cleaning effect and has an outstandingly increased still life. If t/d is less than 1, that is, the uppermost layer is thinner than the mean particle size of alumina particles, the uppermost layer would be exacerbated in surface properties and tend to deteriorate electromagnetic properties. If t/d is more than 4, that is, the uppermost layer is too thick, alumina particles would protrude from the uppermost magnetic layer surface to a less extent, which would result in a reduced head cleaning effect and a short still life.

Preferably the inorganic material-containing alumina particles are contained in the uppermost magnetic layer in an amount of 0.4 to 16% by weight, especially 3 to 12% by weight. With a content of less than 0.4%, alumina particles would fail to fully reinforce the magnetic layer and would protrude from the magnetic layer surface to a less extent, which would result in a reduced head cleaning effect and a short still life. With a content of more than 16%, the uppermost magnetic layer would be exacerbated in surface properties, tending to deteriorate electromagnetic properties.

The alumina particles contain an inorganic material, preferably oxides of such elements as Si, Fe, Ti, W, Mg, and Mn. Among these, Si, Fe, and Ti are especially preferred elements of the inorganic material.

Preferably the inorganic materials are present in a total amount of 0.05 to 5.0%, especially 0.08 to 2.0% by weight of the inorganic material-containing alumina ($Al_2O_3$) particles when the inorganic materials are calculated as $SiO_2$, $Fe_2O_3$, $TiO_2$, $WO_3$, MgO, and MnO. By incorporating such an amount of inorganic material into alumina particles, for example, by a process to be described later, alumina particles become abrasive particles having significantly improved head cleaning effect and still life extension. If the content of inorganic material in alumina is too high, for unknown reasons alumina particles would be less dispersible, resulting in a loss of electromagnetic properties. If the content of inorganic material in alumina is too low, the head cleaning effect would be reduced, losing the advantages of still life extension and clogging prevention.

With respect to the distribution of inorganic material in an alumina particle, the inorganic material may be localized near or at the particle surface or uniformly distributed throughout the particle, with the latter being preferred. The inorganic material which is often present in the form of an oxide forms a solid solution with $Al_2O_3$ or is dispersed and precipitated in $Al_2O_3$ crystals.

Any desired method may be used for the preparation of inorganic material-containing alumina particles. Preferably such alumina particles are prepared by firing a mixture of an aluminum compound and an inorganic compound. One exemplary process is by starting with a solution containing an aluminum compound such as aluminum halide, aluminum sulfate and aluminum nitrate, uniformly mixing with the solution an inorganic compound capable of converting into an oxide by firing, recovering an aluminum compound by a neutralization method, recrystallization method or by precipitating a carbonate salt with ammonium hydrogen carbonate, and firing the recovered aluminum compound. Another exemplary process is by starting with a solution of an organic aluminum compound (for example, an aluminum alkoxide such as aluminum methoxide, aluminum ethoxide, aluminum isopropoxide and aluminum butoxide, an alkyl aluminum such as trimethyl aluminum and triethyl aluminum, an aluminum carboxylate and an aluminum dicarboxylate), uniformly mixing with the solution an inorganic compound capable of converting into an oxide by firing, recovering an aluminum compound through hydrolysis, and firing the recovered aluminum compound. The inorganic compound capable of converting into an oxide by firing includes hydroxides, sulfates, ammonium salts and halides of the aforementioned inorganic elements. Firing conditions include a temperature of about 1,000° to 1,400° C. and a time of about 1 to 4 hours.

When abrasives in the form of inorganic material-coated alumina particles which are obtained by treating alumina particles on their surface with an inorganic material or common alumina particles free of an inorganic material are used instead of the inorganic material-containing alumina prepared as above, no improvements in clogging and still life are obtained with a magnetic layer which is formed using a ultrafine ferromagnetic powder and a highly dispersible binder selected for meeting the requirements of increasing the density and shortening the wavelength of record signals.

Beside the inorganic material-containing alumina particles, the uppermost magnetic layer contains a ferro-magnetic powder. The ferromagnetic powder is not particularly limited and may be selected from ferromagnetic metal powders and various oxide magnetic powders such as cobalt-doped ferromagnetic iron oxide powder, ferromagnetic chromium dioxide fine powder, and barium ferrite.

The ferromagnetic powder may take any commonly used form such as needle, spindle, granule and plate shapes. Needle and spindle shapes are preferred to granule and plate shapes because the former particles are more susceptible to orientation under a magnetic field and the magnetic layer itself is increased in strength in a longitudinal direction.

Preferably the ferromagnetic powder has an average length (or major diameter) of 0.05 to 0.6 μm, especially 0.08 to 0.4 μm and an average aspect ratio (length/breadth) of from 2 to 20, especially from 4 to 15. With an average length of more than 0.6 μm, the resulting tape would be increased in bulk noise. With an average length of less than 0.05 μm, magnetic particles would agglomerate in the magnetic paint prior to coating. When a ferromagnetic metal powder is used as the ferromagnetic powder in the magnetic layer, it should contain more than 75%, especially more than 80% by weight of a ferromagnetic metal (e.g., Fe, Co, and Ni) or an alloy thereof.

The ferromagnetic powder typically has a coercivity Hc of about 300 to 2,500 Oe, especially about 500 to 2,200 Oe. With higher Hc, it would be difficult to record signals with a conventional head. Lower Hc would not permit recorded signals of short wavelength to be reproduced with an acceptable output. The ferromagnetic powder preferably has a saturation magnetization us of about 50 to 180 emu/g, especially about 60 to 150 emu/g because reproduction outputs would be low with lower $\sigma_s$.

Preferably the magnetic layer contains about 50 to 95%, especially about 75 to 90% by weight of ferromagnetic powder. Higher contents of ferromagnetic powder would make it difficult to improve the surface smoothness of the magnetic layer by calendering whereas lower contents of ferromagnetic powder would result in low reproduction outputs.

A binder is additionally contained in the uppermost magnetic layer of the magnetic recording medium of the present invention. The binder used herein may be selected from conventional binders, for example, thermoplastic resins, thermosetting resins, reactive resins, electron beam-curable resins and mixtures thereof.

Examples of the thermoplastic resin include vinyl chloride-acrylate copolymers, vinyl chloride-vinyl acetate copolymers, vinyl chloride-vinylidene chloride copolymers, vinyl chloride-acrylonitrile copolymers, acrylate-acrylonitrile copolymers, acrylate-vinylidene chloride copolymers, methacrylate-vinylidene chloride copolymers, methacrylate-ethylene copolymers, polyvinyl fluoride-vinylidene chloride-acrylonitrile copolymers, acrylonitrile-butadiene copolymers, polyamide resins, polyvinyl butyral, cellulose derivatives (e.g., cellulose acetate butyrate, cellulose diacetate, cellulose triacetate, cellulose propionate, and nitrocellulose), styrene-butadiene copolymers, polyester resin-chlorovinyl ether-acrylate copolymers, amino resins, and synthetic rubbers, alone or in admixture of two or more.

Preferred among these is a combination of vinyl chloride and polyurethane resins. The vinyl chloride resin is preferably one containing sulfur (S) as a polar group, especially a sulfate group and/or sulfonate group. The sulfate and sulfonate groups are represented by —SO$_4$Y and —SO$_3$Y, respectively, wherein Y is H or an alkali metal. Sodium is the preferred alkali metal of Y, that is, —SO$_4$Na and —SO$_3$Na are preferred. The vinyl chloride resin may contain both or either one of sulfate and sulfonate groups. When both are contained, their proportion is arbitrary. The polyurethane resin may contain sulfur (S) or phosphorus (P) as a polar group. Exemplary sulfur-containing groups are sulfonate groups (—SO$_3$Y) and sulfate groups (—SO$_4$Y). Exemplary phosphorus-containing groups are phosphonic acid groups (=PO$_3$Y), phosphinic acid groups (=PO$_2$Y), and phosphonous acid groups (=POY). Again Y is H or an alkali metal, with sodium being preferred. The polyurethane resin preferably contains 0.01 to 10%, especially 0.02 to 3% by weight of such a polar group in a molecule calculated as atoms. The polar groups may be present in the backbone or branches of the resin skeleton.

Examples of the thermosetting resin or reactive resin include phenolic resins, epoxy resins, polyurethane resins, urea resins, melamine resins, alkyd resins, silicone resins, acrylic reactive resins, mixtures of a high molecular weight polyester resin and an isocyanate prepolymer, mixtures of a methacrylate copolymer and a diisocyanate prepolymer, ureaformaldehyde resins, and polyamine resins, alone or in admixture of two or more.

When the above-mentioned binder is used, the underlying non-magnetic layer preferably contains a crosslinking agent. Preferred crosslinking agents are polyisocyanates, typically diisocyanates, with tolylene diisocyanate, hexamethylene diisocyanate and methylene diisocyanate alone or in admixture of two or more being especially preferred. More preferably, crosslinking agents modified so as to have a plurality of hydroxyl groups such as trimethylol propane or isocyanurate type crosslinking agents having three molecules of a diisocyanate compound attached thereto are used so that they will bind with the functional groups contained in the binder resin for crosslinking the resin. The crosslinking agent is preferably contained in an amount of about 10 to 30 parts by weight per 100 parts by weight of the resin. The thermosetting resin may be cured by heating in an oven at about 50° to 70° C. for about 12 to 48 hours.

Another preferred binder is a cured product of an electron beam-curable compound, that is, an electron beam-curable resin. Examples of the electron beam-curable compound include unsaturated prepolymers such as maleic anhydride type, urethane (meth)acrylic type, epoxy (meth)acrylic type, polyester (meth)acrylic type, polyether (meth)acrylic type, polyurethane (meth)acrylic type, and polyamide (meth-)acrylic type prepolymers; and polyfunctional monomers such as ether (meth)acrylic type, urethane (meth)acrylic type, epoxy (meth)acrylic type, phosphate (meth)acrylic type, aryl type, and hydrocarbon type monomers. They may be used alone or in admixture of two or more.

The content of the binder in the magnetic layer is generally about 10 to 30 parts by weight, more preferably about 15 to 25 parts by weight per 100 parts by weight of the ferromagnetic powder. With less contents of the binder, the magnetic layer would become weak, resulting in a loss of dynamic durability. With larger contents of the binder, the relative content of ferromagnetic powder is reduced so that electromagnetic properties might be deteriorated.

In addition to the inorganic material-containing alumina, the uppermost magnetic layer may further contain inorganic non-magnetic powder such as $\alpha\text{-Fe}_2O_3$, $TiO_2$, graphite, CaO, $SiO_2$, $Cr_2O_3$, SiC, $CaCO_3$, $BaSO_4$, ZnO, MgO, boron nitride and TiC, which are generally used as abrasives. The preferred amount of such a conventional abrasive, if co-present, is up to 40% by weight of the entire abrasives (inorganic material-containing alumina plus conventional abrasive). The magnetic layer may further contain dispersants such as surfactants, lubricants such as higher fatty acids, fatty acid esters, and silicone oil, and other various additives which are commonly used in magnetic layers.

The uppermost magnetic layer has a thickness t of 0.2 to 0.5 µm, preferably 0.3 to 0.5 µm. A magnetic layer thinner than 0.2 µm has poor surface properties and hence, poor electromagnetic properties. With a thickness greater than 0.5 µm, more alumina particles are buried in the uppermost magnetic layer and less particles protrude from the layer surface, resulting in a critical loss of head cleaning effect, which is unacceptable in practice in that clogging can occur between a worn head and a virgin tape. There also results a reduced still life. When it is desired to record signals of shorter wavelength, such a thicker coating layer has an increased self demagnetization loss and poor overwrite properties.

In one embodiment, the underlying coating layer included in the magnetic recording medium of the invention is a magnetic layer. The underlying magnetic layer may have the same composition as the uppermost magnetic layer. The inorganic material-containing alumina which is contained in the uppermost magnetic layer for the purposes of improving head cleaning effect and still life may also be used in the underlying magnetic layer. Nevertheless, since a non-magnetic inorganic powder is added to the underlying magnetic layer primarily for increasing the strength of a coating, there may be contained any of conventional non-magnetic inorganic powders which are commonly used as abrasives. The underlying layers, especially the coating layer which is disposed close to the uppermost magnetic layer should preferably contain an antistatic agent such as carbon black for the purpose of preventing the magnetic recording medium from being electrically charged.

In another embodiment, the underlying coating layers include a non-magnetic layer. The non-magnetic layer may have the same composition as the underlying magnetic layer except that the ferromagnetic powder is replaced by a non-magnetic powder. The non-magnetic powder used herein may be selected from various inorganic powders, for example, non-magnetic iron oxide ($\alpha\text{-Fe}_2O_3$) needles. Use of spherical ultrafine iron oxide is preferred since it is well dispersible, permitting the non-magnetic layer to have a higher loading of non-magnetic powder. Then the non-magnetic layer itself is improved in surface properties, which contributes to the surface properties of the uppermost magnetic layer for improving the electromagnetic properties thereof. There may also be used various non-magnetic powders such as needle $\alpha\text{-Fe}_2O_3$ and spherical titanium oxide as disclosed in JP-A 191315/1988 and 191318/1988. In an embodiment wherein the non-magnetic layer is disposed close to the uppermost magnetic layer, an antistatic agent such as carbon black should preferably be contained in the non-magnetic layer for anti-static purposes. The non-magnetic layer contains a binder, solvent, abrasive, lubricant and other additives which are the same as used in the underlying magnetic layer.

The embodiment wherein the underlying coating layers are two or more layers including magnetic and non-magnetic layers is also encompassed in the present invention. The coating layers preferably have a total thickness of 1.5 to 2.5 µm, especially 1.8 to 2.2 µm. If the underlying layer or layers are too thin, they would be readily affected by the surface properties of the non-magnetic substrate so that the underlying layer and hence, the uppermost layer might be exacerbated in surface properties, resulting in a loss of electromagnetic properties. A thinner layer allows for a higher light transmittance which is inconvenient when the tape end is detected by a change of light transmittance. No further improvement in performance is achieved by increasing the thickness of the underlying layer beyond a certain limit.

Each of the uppermost magnetic layer, underlying magnetic layer, and underlying non-magnetic layer is formed by mixing components of the corresponding composition with a solvent to prepare a coating composition or paint. The solvent used herein is not particularly limited and a choice may be made in consideration of the solubility of the binder and compatibility with other components. Exemplary solvents or diluents include ketones such as acetone, methyl ethyl ketone, methyl isobutyl ketone, and cyclohexanone; aromatic hydrocarbons such as toluene, xylene, and ethylbenzene; esters such as ethyl formate, ethyl acetate, and butyl acetate; alcohols such as methanol, ethanol, isopropanol, and butanol; ethers such as isopropyl ether, ethyl ether, and dioxane; furans such as tetrahydrofuran and furfural; dimethylformamide and vinyl pyrrolidone, alone or in admixture of two or more. No particular limit is imposed on the content of the solvent in the paint and the mix proportion of the solvents because such factors can be suitably determined by considering the composition of paint, preparation procedure, and coating process. It is also not critical how to mix the components with the solvent.

The magnetic paint and non-magnetic paint are applied to a non-magnetic substrate to form magnetic and non-magnetic coating layers, respectively. No particular limit is imposed on the material of which the non-magnetic substrate is made. A suitable material may be chosen from various flexible and rigid materials depending on a particular purpose and processed to a desired shape (typically tape) and size in accordance with a selected standard. Examples of the flexible material include polyesters such as polyethylene terephthalate (PET) and polyethylene naphthalate, polyolefins such as polypropylene, polyamides, polyimides, and polycarbonates.

Any of commonly used processes may be used for coating. When two or more coating layers (including a magnetic layer) are coated on a non-magnetic substrate, there may be used a wet-on-wet coating process of coating two or more coatings in a wet state in an overlapping manner or a wet-on-dry coating process of coating a layer on a non-magnetic substrate and coating an upper layer thereon after drying. The wet-on-wet coating process is preferred because of higher productivity and the like. In this regard, it is preferred that more than 10% of the organic solvent remains in a lower layer when an upper layer is coated.

Any desired coating means may be used herein. For example, gravure coating and reverse roll coating means may be used. Use of a die nozzle coater is preferred because of easy operation and high productivity.

The magnetic head with which the magnetic recording medium of the invention is operated for recording and replay may be of any desired type such as multi-layer, MIG and ring types. The medium exerts maximum clogging prevention effect particularly when the protrusion at the head gap is worn by about 5 to 10 μm.

EXAMPLE

Examples of the present invention are given below by way of illustration and not by way of limitation.

EXAMPLE 1

There were prepared coating compositions for three coating layers: an uppermost magnetic layer, an underlying magnetic layer and an underlying non-magnetic layer.

| Coating composition for uppermost magnetic layer | Parts by weight |
| --- | --- |
| Ferromagnetic powder (Co—FeOx, $1.33 \leq x \leq 1.50$, BET 50 m²/g) | 100 |
| Vinyl chloride copolymer (MR110, Nippon Zeon K.K.) | 10 |
| Polyurethane resin (N-2304, Nihon polyurethane Kogyo K.K.) | 10 |
| Inorganic material-containing $Al_2O_3$ (abrasive) | Table 1 |
| Fatty acid | 0.5 |
| Fatty acid ester | 0.5 |
| Methyl ethyl ketone | 350 |

The ingredients were admitted into a ball mill and agitated and dispersed therein. 3 parts by weight of polyisocyanate (Colonate L, Nihon polyurethane Kogyo K. K. ) was added to the dispersion, followed by further agitation and dispersion. In this way, there was prepared a coating composition for the uppermost magnetic layer. Note that Table 1 reports the mean particle size of inorganic material-containing alumina particles, the content of alumina particles in the magnetic layer, the type of inorganic element, and the content of inorganic material in the alumina particles.

| Coating composition for underlying magnetic layer | Parts by weight |
| --- | --- |
| Ferromagnetic powder (Co—FeOx, $1.33 \leq x \leq 1.50$, BET 35 m²/g) | 100 |
| Vinyl chloride copolymer (MR110, Nippon Zeon K.K.) | 10 |
| Polyurethane resin (N-2304, Nihon polyurethane Kogyo K.K.) | 10 |
| $Cr_2O_3$ | 4 |
| Carbon black | 10 |
| Fatty acid | 0.5 |
| Fatty acid ester | 0.5 |
| Methyl ethyl ketone | 400 |

The ingredients were admitted into a ball mill and agitated and dispersed therein. 3 parts by weight of polyisocyanate (Colonate L, Nihon polyurethane Kogyo K. K.) was added to the dispersion, followed by further agitation and dispersion. In this way, there was prepared a coating composition for the underlying magnetic layer.

A coating composition for the underlying non-magnetic layer was prepared by the same procedure as the coating composition for the underlying magnetic layer except that $\alpha\text{-}Fe_2O_3$ was used instead of the ferromagnetic powder.

Using a die nozzle coater, the coating compositions for the uppermost magnetic layer and the underlying magnetic or non-magnetic layer were simultaneously coated onto a length of non-magnetic web by a wet-on-wet coating process to form two layers thereon. The coated web was subject to calendering, heat curing and cutting to a ½ inch width, obtaining a 120-minute VHS magnetic tape. These tapes were designated sample Nos. 1 to 11. At the end of heat curing, the underlying coating layer was 2.0 μm thick and the uppermost magnetic layer was 0.4 μm thick.

The magnetic tape samples were measured for electromagnetic properties (Y—S/N and C—S/N). For evaluation of clogging, the tape samples were subject to Test 1: a clogging test by repeated operation under high temperature/ high humidity conditions and Test 2: a clogging test using a worn magnetic head. A still life was also measured. Measurement procedures are described below. The results are shown in Table 1.

Electromagnetic properties

Y—S/N: Using a noise meter UPSF2 manufactured by Rohde & Schwarz AG and a video cassette recorder BR7000A manufactured by Nippon Victor K. K., 50% white signals were recorded in and reproduced from a tape sample for measuring a S/N ratio. The difference in S/N between the tape sample and the standard tape VRT-2 (manufactured by Nippon Victor K. K.) was reported in dB.

C—S/N: Using a noise meter UPSF2 manufactured by Rohde & Schwarz AG and a video cassette recorder BR7000A manufactured by Nippon Victor K. K., chrominance signals were recorded in and reproduced from a tape sample for measuring a S/N ratio. The difference in S/N between the tape sample and the standard tape VRT-2 (manufactured by Nippon Victor K. K.) was reported in dB.

Clogging

Test 1: Mainly for the purpose of evaluating clogging as a result of a magnetic layer losing durability, a tape sample was repeatedly driven across a head in a hot humid environment of 60° C. and RH 80%. The number of passes repeated until the head was clogged was counted. The head was judged clogged when the reproduction output of a recorded color bar signal lowered 30%.

Test 2: The main purpose of Test 2 was to evaluate head cleaning effect. A video cassette recorder NV-FS800 manufactured by Matsushita Electric K. K. was equipped with a used head which had been worn to a protrusion of 10 μm. For each tape sample, there were furnished a plurality of tape cassettes which had not been used after manufacture. Each cassette was continuously operated for recording and reproducing color bar signals. The number of cassettes operated until the head was clogged was counted. The judgment of head clogging was the same as in Test 1.

Still life

Still mode reproduction was carried out in an environment at −10° C. The time taken until the output lowered to 70% of the initial output was measured.

Comparative Example 1

VHS magnetic tape samples, Nos. 21 and 22, were prepared by the same procedure as in Example 1 except that non-treated alpha-alumina (conventional alumina abrasive) was used instead of the inorganic material-containing alumina in the uppermost magnetic layer. The magnetic tape samples were examined for electromagnetic properties, clogging and still life as in Example 1, with the results shown in Table 1.

TABLE 1

| Sample No. | Inorganic materal-containing alumina particles | | | | Uppermost magnetic layer | | Electro-magnetic properties | | Clogging | | Still life |
| --- | --- | --- | --- | --- | --- | --- | --- | --- | --- | --- | --- |
| | Mean particle size (μm) | Element contained | Inorganic material content (wt %) | t/d | Abrasive content (wt %) | Underlying coating layer Type | Y-S/N (dB) | C-S/N (dB) | Test 1 Number of passes | Test 2 Number of cassettes | (−10° C.) (min.) |
| 1 | 0.11 | Si | 0.12 | 3.6 | 7 | Magnetic layer | +3.0 | +3.0 | >200 | >20 | >120 |
| 2 | 0.22 | Si | 0.12 | 1.8 | 7 | Magnetic layer | +3.0 | +3.0 | >200 | >20 | >120 |
| 3 | 0.22 | Si | 0.12 | 1.8 | 0.5 | Magnetic layer | +3.2 | +3.2 | >200 | 17 | >120 |
| 4 | 0.22 | Si | 0.12 | 1.8 | 15.0 | Magnetic layer | +2.8 | +2.8 | >200 | >20 | >120 |
| 5 | 0.28 | Si | 0.12 | 1.4 | 7 | Magnetic layer | +3.0 | +3.0 | >200 | >20 | >120 |
| 6 | 0.22 | Fe | 0.5 | 1.8 | 7 | Magnetic layer | +3.0 | +3.0 | >200 | >20 | >120 |
| 7 | 0.22 | Si + Fe | 0.5 + 0.5 | 1.8 | 7 | Magnetic layer | +3.0 | +3.0 | >200 | >20 | >120 |
| 8 | 0.22 | Ti | 1.0 | 1.8 | 7 | Magnetic layer | +3.0 | +3.0 | >200 | >20 | >120 |
| 9 | 0.22 | Si | 0.12 | 1.8 | 7 | Non-Magnetic layer | +3.0 | +3.0 | >200 | >20 | >120 |
| 10 (comparison) | 0.07* | Si | 0.12 | 5.7 | 7 | Magnetic layer | +3.2 | +3.3 | 120 | 7 | 60 |
| 11 (comparison) | 0.35* | Si | 0.12 | 1.1 | 7 | Magnetic layer | +1.8 | +1.8 | >200 | >20 | >120 |
| 12 (comparison) | 0.22 | —* | — | 1.8 | 7 | Magnetic layer | +3.0 | +3.0 | 55 | 5 | 55 |
| 22 (comparison) | 0.22 | —* | — | 1.8 | 7 | Non-Magnetic layer | +3.0 | +3.0 | 65 | 5 | 55 |

*outside the scope of the invention

EXAMPLE 2

VHS magnetic tape samples, Nos. 31 to 36, were prepared using the same coating compositions as sample No. 2 in Table 1 except that the thickness of the uppermost magnetic layer was changed as shown in Table 2. The magnetic tape samples were examined for electromagnetic properties, clogging and still life as in Example 1, with the results shown in Table 2. These samples showed electromagnetic properties equal to those of sample No. 2 of Example 1.

TABLE 2

| Sample No. | Uppermost magnetic layer Thickness (μm) | t/d | Underlying coating layer Thickness (μm) | Clogging Test 1 Number of passes | Test 2 Number of passes | Still life (−10° C.) (min.) |
| --- | --- | --- | --- | --- | --- | --- |
| 31 (comparison) | 1.5 | 6.8 | 2.0 | 150 | 9 | 110 |
| 32 (comparison) | 0.8 | 3.6 | 2.0 | 170 | 10 | 110 |
| 33 (comparison) | 0.6 | 2.7 | 2.0 | 180 | 12 | 110 |
| 34 | 0.5 | 2.3 | 2.0 | >200 | >20 | >120 |
| 35 | 0.4 | 1.8 | 2.0 | >200 | >20 | >120 |
| 36 | 0.3 | 1.4 | 2.0 | >200 | >20 | >120 |
| 41 (comparison) | 2.4 | 10.9 | — | 150 | 9 | 100 |

Comparative Example 2.

A VHS magnetic tape sample, No. 41, was prepared approximately as in Example 1 except that a single layer structure was employed, that is, only the uppermost magnetic layer was formed on a non-magnetic substrate. The underlying coating layer was omitted, and instead, the thickness of the uppermost magnetic layer was increased to 2.4 μm. The magnetic paint had the same composition as the uppermost magnetic layer of sample No. 2 in Table 1. The remaining parameters were the same as in Example 1. The magnetic tape samples were examined for electromagnetic properties, clogging and still life as in Example 1, with the results shown in Table 2. As to electromagnetic properties, this sample showed Y—S/N=+3.0 dB and C—S/N=+3.0 dB.

Comparative Example 3

VHS magnetic tape samples, Nos. 51 to 53, were prepared as in Example 1 except that the inorganic material-containing alumina in the uppermost magnetic layer was replaced by abrasives in the form of alumina particles surface coated with silicon, iron or titanium oxide (coated alumina abrasive). The magnetic tape samples were examined for electromagnetic properties, clogging and still life as in Example 1, with the results shown in Table 3.

TABLE 3

| | Alumina particles | | | Uppermost | | Electromagnetic properties | | Clogging | | Still life |
| --- | --- | --- | --- | --- | --- | --- | --- | --- | --- | --- |
| | Mean particle | | Inorganic material | magnetic | Underlying | | | Test 1 | Test 2 | |
| Sample No. | size (μm) | Element and form | content (wt %) | layer (wt %) | coating layer Type | Y-S/N (dB) | C-S/N (dB) | Number of passes | Number of passes | (−10° C.) (min.) |
| 51 (comparison) | 0.22* | Fe-coated* | 0.5 | 7 | Magnetic layer | +3.0 | +3.0 | 95 | 6 | 75 |
| 52 (comparison) | 0.22* | Si-coated* | 0.12 | 7 | Magnetic layer | +3.0 | +3.0 | 95 | 6 | 74 |
| 53 (comparison) | 0.22* | Ti-coated* | 1.0 | 7 | Magnetic layer | +3.0 | +3.0 | 95 | 6 | 75 |

*outside the scope of the invention

As is evident from Tables 1 to 3, magnetic recording media using the specific alumina abrasive in the uppermost magnetic layer show excellent results of electromagnetic properties, clogging and still life tests, especially an outstanding head cleaning effect in the clogging test (Test 2). Magnetic recording media using the conventional and coated alumina abrasives in the uppermost magnetic layer show poor results of clogging and still life tests. A magnetic recording medium of a single layer structure having an uppermost magnetic layer of an increased thickness shows an inferior head cleaning effect and have poor results of clogging and still life tests due to deteriorated durability of the magnetic layer.

There has been described a magnetic recording medium which ensures effective head cleaning and is improved in durability and still life.

Japanese Patent Application No. 346248/1993 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A magnetic recording medium comprising at least two coating layers on one surface of a non-magnetic substrate, wherein the uppermost layer of the coating layers is a magnetic layer having a thickness t of 0.2 to 0.5 μm and containing 0.4–16% by weight of alumina particles containing an oxide of elements selected from the group consisting of Si, Fe, Ti, W, Mg, Mn and mixtures thereof and having a mean particle size d of 0.1 to 0.3 μm, wherein the ratio t/d is a number in the range of from 1:1 to 4:1, wherein the oxide contained in the alumina particles is present in a total amount of 0.05 to 5.0% by weight of the alumina particles when calculated as $SiO_2$, $Fe_2O_3$, $TiO_2$, $WO_3$, MgO and MnO.

2. The magnetic recording medium of claim 1 wherein the alumina particles are prepared by firing a mixture of an aluminum compound and an inorganic compound so that inorganic material is incorporated within alumina particles.

3. The magnetic recording medium of claim 1 wherein the coating layers are formed by a wet-on-wet coating process.

4. The magnetic coating medium of claim 1, wherein the oxide present in the alumina particles is present as an oxide in solid solution with aluminum oxide or is dispersed and precipitated in aluminum oxide crystals in the alumina particles.

* * * * *

UNITED STATES PATENT AND TRADEMARK OFFICE
CERTIFICATE OF CORRECTION

PATENT NO. : 5,510,179

DATED : April 23, 1996

INVENTOR(S) : Kiyoto FUKUSHIMA et al.

It is certified that error appears in the above-identified patent and that said Letters Patent is hereby corrected as shown below:

Column 14, line 32, before "inorganic" insert --the--.

Signed and Sealed this

Tenth Day of December, 1996

Attest:

BRUCE LEHMAN

Attesting Officer

Commissioner of Patents and Trademarks